United States Patent
Mardugalliamov

(10) Patent No.: US 9,507,817 B2
(45) Date of Patent: Nov. 29, 2016

(54) METHOD FOR SYNCHRONIZING ACCESS TO SHARED RESOURCES OF A COMPUTING SYSTEM AND DETECTING AND ELIMINATING DEADLOCKS USING LOCK FILES

(71) Applicant: Joint stock company "InfoTeCS", Moscow (RU)

(72) Inventor: Ruslan Takhirovich Mardugalliamov, g. Krasnogorsk (RU)

(73) Assignee: Joint Stock Company "Info TeCS", Moscow (RU)

( * ) Notice: Subject to any disclaimer, the term of this patent is extended or adjusted under 35 U.S.C. 154(b) by 812 days.

(21) Appl. No.: 13/938,660

(22) Filed: Jul. 10, 2013

(65) Prior Publication Data

US 2014/0089256 A1 Mar. 27, 2014

(30) Foreign Application Priority Data

Sep. 21, 2012 (RU) ................. 2012140253

(51) Int. Cl.
   *G06F 9/46* (2006.01)
   *G06F 17/30* (2006.01)
(52) U.S. Cl.
   CPC ... *G06F 17/30345* (2013.01); *G06F 17/30168* (2013.01)

(58) Field of Classification Search
   None
   See application file for complete search history.

(56) References Cited

U.S. PATENT DOCUMENTS

| 6,292,792 B1* | 9/2001 | Baffes | G06N 5/022 |
| | | | 706/45 |
| 2003/0182285 A1* | 9/2003 | Kuwata | G06F 17/3089 |

* cited by examiner

*Primary Examiner* — Mengyao Zhe
(74) *Attorney, Agent, or Firm* — Honigman Miller Schwartz and Cohn LLP

(57) ABSTRACT

The disclosure generally relates to computer engineering, in particular, to a method for synchronizing access to shared resources of a computing system, and for detecting and eliminating deadlocks using lock files. The disclosure advantageously improves reliability of detection and elimination of deadlocks. The method grants access to a shared resource to other processes and ensures that there will be no deadlock in cases where the process, whose data is indicated in the lock file, does not currently exist in the computing system (for example, an application was aborted from RAM by the operating system due to an internal software failure). The method can be preferably implemented in POSIX-compatible operating systems, in particular, the GNU/Linux operating system.

1 Claim, No Drawings

METHOD FOR SYNCHRONIZING ACCESS TO SHARED RESOURCES OF A COMPUTING SYSTEM AND DETECTING AND ELIMINATING DEADLOCKS USING LOCK FILES

TECHNICAL FIELD

The disclosure relates to computer engineering, in particular, to synchronizing access to shared resources of a computing system, and to detecting and eliminating deadlocks using lock files.

BACKGROUND

Methods for synchronizing access of parallel (concurrent) processes/applications to shared resources (including files, memory sections, etc.) of a computing system are presently known. When synchronization is provided, exclusive access is granted to a single process only and a resource itself is locked for writing and/or reading by other processes. Locking can be performed by different methods, however, situations are possible when a resource is locked by multiple processes at the same time and none of the processes can either unlock or perform necessary operations on the shared resource.

This situation is commonly referred to as "deadlock", and various mechanisms are used to detect and then eliminate deadlocks.

The known method for avoiding deadlocks when performing storage updates in a multi-processor environment having a local cache for each processor, wherein each processor is able to operate in a fast, slow, or enhanced slow mode, comprises:

receiving an instruction that includes accessing a data store;

switching the processor to the fast mode where multiple instructions are executed in parallel and a target cache entry associated with the data store is acquired from the local cache with an exclusive ownership status prior to execution of the instruction;

initializing execution of the instruction in the fast mode;

in response to detecting a possible deadlock during execution in the fast mode:
  interrupting execution of the instruction in the fast mode;
  switching the processor to the slow mode where a single instruction is executed at a time and the target cache entry is acquired from the local cache with the exclusive ownership status prior to execution of the instruction;
  initializing execution of the instruction in the slow mode;
  in response to detecting a possible deadlock during execution in the slow mode:
    interrupting execution of the instruction in the slow mode;
    switching the processor to the enhanced slow mode where a single instruction is executed at a time and the target cache entry is acquired from the local cache with a read only status prior to execution of the instruction and with the exclusive ownership status upon completion of execution of the instruction; and
    initializing execution of the instruction in the enhanced slow mode (See U.S. Pat. No. 7,953,932).

Upon completion of execution of the instruction in the enhanced slow mode (or in the slow mode), the processor can be reset to the fast mode.

A possible deadlock is regarded as detected when a predetermined threshold number of exclusive rejects is exceeded without any indicia of completion of execution of the instruction.

This method has disadvantages, such as, in particular, the need to switch the processor to the slow and enhanced slow mode, which deteriorates performance of the computing system. Furthermore, detection of a deadlock has a probabilistic nature and depends on the predetermined threshold number of exclusive rejects.

Another known method for synchronizing access to shared resources between parallel processes using a lock file mechanism comprises:

associating a shared resource with a lock file;

creating a lock file when a process (application) attempts to access the shared resource;

if such a lock file already exists, the operation is ended with an error;

if such a lock file does not exist, the lock file is created;

writing, to the lock file just created and opened, data of the process that has created the lock file (a process ID (PID), etc.);

causing the process to perform operations on the shared resource;

unlocking the shared resource (file) by removing the lock file.

The method described above is considered to be known (See Michael K. Johnson, Erik W. Troan. Linux Application Development, $2^{nd}$ ed., Addison-Wesley Professional; $2^{nd}$ edition (Nov. 27, 2004), Section 13.3: File Locking).

However, said known method has a drawback as well. In particular, if a process possessing a lock has completed incorrectly and has not removed the lock file, then none of the processes can access the shared resource, and a deadlock arises. Therefore, reliability of this known method is not high.

SUMMARY

To exclude possible occurrence of deadlocks, the system should be checked for presence of a process whose data is indicated in the existing lock file.

To this end, a method is provided comprising:

associating a shared resource with a lock file;

invoking a system call for atomic exclusive creation and opening of a temporary file with a unique name in the same file system, in which the lock file is to be created, from a current process which attempts to access the shared resource;

placing, into the temporary file, information on the current process (PID and/or other data from which the presence of this process in the system can be identified) which attempts to access the shared resource;

executing a system call for creating a hard link with the lock file name to the temporary file;

if the system call for creating a hard link is successful, then:
  removing the hard link to the temporary file;
  causing the current process to perform operations on the shared resource;
  removing the lock file;

if the system call for creating a hard link is completed with an error and the error does not relate to the fact that a file with the lock file name already exists, then removing the temporary file;

if the system call for creating a hard link is completed with an error and the error relates to the fact that a file with the lock file name already exists, then:
  removing the temporary file;
  searching for a process specified in the existing lock file by:
    setting a write file lock on the existing lock file;
    checking the system for presence of a process whose data is indicated in the existing lock file;
    if the current process already exists in the system, then removing the write file lock on the existing lock file;
    if the current process does not exist in the system, then eliminating the deadlock by the following steps:
      removing previous data of the non-existent process from the existing lock file;
      entering data of the current process into the existing lock file;
      removing the write file lock from the existing lock file;
      causing the current process to perform operations on the shared resource;
      removing the existing lock file.

Therefore, if the check reveals that the process whose data is in the lock file does not currently exist in the computer system (for example, an application was aborted from RAM by the operating system (OS) due to an internal software failure), this fact does not prevent from providing other processes with access to the shared resource and ensuring that there is no deadlock.

An object of the disclosure is to improve reliability of detection and elimination of deadlocks.

EMBODIMENT OF THE DISCLOSURE

The present method can be implemented in a computer system operating under control of a POSIX-compatible operating system, in particular, the GNU/Linux operating system, where the lock file mechanism for synchronizing access to a shared resource is widely used.

A necessary condition for implementing the present method is availability in the computer operating system of the following means described in ISO/IEC/IEEE 9945-1: 2008 Standard for: Information technology—Portable Operating System Interface (POSIX®) Base Specifications:
  system calls for file operations;
  operations of atomic exclusive creation and opening of a temporary file with a unique name (for example, executed by the system call « mkstemp » );
  support of hard links by the operating system and file system in which a lock file is to be created;
  support of file locks and availability of system calls to operate with them.

All of those means are available in the GNU/Linux operating system, in particular, in the Debian 6 OS release available to any user.

Hard links are supported by most file systems, in particular, Ext3 (Extended File System version 3) which is supported by Debian operating system.

To implement the method in a created or modified software program or software module designed to operate with shared resources, the following steps should be provided.

A shared resource (e.g. a serial port) is associated with a lock file. This can be done, for example, by generating a constant containing a path to the lock file.

Before accessing the shared resource, the system call « mkstemp » is invoked in each process by calling the system function having the same name, along with specifying, as a template of the path for creating a temporary file, a path in the same file system where the lock file is to be created.

By using the system call « write » , the temporary file is supplemented with information on the current process (a process PID in the simplest case) from which the presence of a process trying to access the shared resource in the system can be identified.

The system call « link » is invoked by the function having the same name where the path to the temporary file is provided as the first argument and the path to the lock file, with which the shared resource is associated, is provided as the second argument.

If the function "link" returns 0, then:
  the hard link to the temporary file is deleted by invoking the system call « unlink » ;
  the current process is caused to perform operations on the shared resource;
  the lock file is removed using the system call « unlink » .

If the function « link » returns −1 and "errno" (error return value) contains an error code different from EEXISTS, then the temporary file is deleted.

If the function « link » returns −1 and "errno" contains EEXISTS error code, then:
  the temporary file is removed by invoking the system call « unlink » where the path to the temporary file is provided as the argument;
  a process specified in the existing lock file is searched for by the following actions:
    opening the existing lock file for writing; to this end, the system call « open » is invoked in such a way that the path to the lock file, with which the shared resource is associated, is provided as the first argument and the read/write mode is provided as the second argument, and the returned file descriptor number of the open lock file is stored;
    setting a write file lock by invoking the system call « fcntl » where the file descriptor number of the open lock file is provided as the first argument, F_SETLKW is provided as the second argument, and the filled structure « flock » is provided as the third argument, for locking the entire contents of the file;
    reading the file contents by the file system call "read";
    checking the system for presence of a process whose data is indicated in the existing lock file (when a process PID is chosen as process data, the check can be carried out by the system call « kill » where the PID read from the existing lock file is provided as the first argument and 0 is provided as the second argument);
  if the current process exists in the system (when a process PID is chosen as process data, then the system call « kill » returns 0), then the write file lock on the existing lock file is removed;
  if the current process does not exist in the system (when a process PID is chosen as process data, the system call « kill » returns −1 and "errno" contains the error code ENOEXIST), then the deadlock is eliminated by the following steps:
    removing, from the existing lock file, previous data on the non-existing process by executing the system call "trunk" where the file descriptor number of the open lock file is provided as the argument;
    determining information about the current process (when a PID is used, the system call "getpid" is executed and the returned value is stored);
    entering the current process data into the existing lock file by executing the system call « write » ;

removing the write file lock from the existing lock file by invoking the system call « fcntl » where the file descriptor number of the open lock file is provided as the first argument, F_SETLKW is provided as the second argument, and the filled structure « flock » is provided as the third argument, for unlocking the entire contents of the file;

causing the current process to perform operations on the shared resource;

removing the existing lock file by invoking the system call « unlink » where the path to the lock file is provided as the argument.

The skilled person (programmer) will be able to implement these steps of the present method in practice within a program or function.

The invention claimed is:

1. A method for synchronizing access to a shared resource of a computing system, comprising:
associating the shared resource with a lock file;
invoking a system call for atomic exclusive creation and opening of a temporary file with a unique name in a same file system in which the lock file is to be created, from a current process which attempts to access the shared resource;
placing, into the temporary file, information about the current process, wherein the information about the current process includes PID and/or other data from which the current process in the system is identified which attempts to access the shared resource;
executing a system call for creating a hard link with the lock file name to the temporary file;
if the system call for creating the hard link is successful:
  removing the hard link to the temporary file;
  causing the current process to perform operations on the shared resource;
  removing the lock file;
if the system call for creating the hard link is completed with an error and the error does not relate to a fact that a file with the lock file name already exists, then removing the temporary file;
if the system call for creating the hard link is completed with the error and the error relates to the fact that a file with the lock file name already exists, then:
  removing the temporary file;
  searching for a process specified in the lock file by:
  setting a write file lock on the lock file;
  checking the system for presence of the process whose data is indicated in the lock file;
if the current process exists in the system, then removing the write file lock on the lock file;
if the current process does not exist in the system, performing the following actions:
  removing previous data from the lock file;
entering data of the current process into the lock file;
removing the write file lock from the lock file;
causing the current process to perform operations on the shared resource;
removing the lock file.

* * * * *